United States Patent
Suzuki

(10) Patent No.: US 9,268,593 B2
(45) Date of Patent: Feb. 23, 2016

(54) COMPUTER-READABLE RECORDING MEDIUM, VIRTUAL MACHINE CONTROL METHOD AND INFORMATION PROCESSING APPARATUS

(71) Applicant: FUJITSU LIMITED, Kawasaki-shi, Kanagawa (JP)

(72) Inventor: Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 9 days.

(21) Appl. No.: 14/446,927

(22) Filed: Jul. 30, 2014

(65) Prior Publication Data
US 2014/0344811 A1     Nov. 20, 2014

Related U.S. Application Data

(63) Continuation of application No. PCT/JP2012/052529, filed on Feb. 3, 2012.

(51) Int. Cl.
 G06F 13/00  (2006.01)
 G06F 9/455  (2006.01)
 G06F 9/54   (2006.01)

(52) U.S. Cl.
 CPC .............. *G06F 9/45558* (2013.01); *G06F 9/54* (2013.01); *G06F 2009/45595* (2013.01)

(58) Field of Classification Search
 CPC ...... G06F 9/45533; G06F 9/541; G06F 9/546
 USPC ...................................... 718/1; 719/313, 319
 See application file for complete search history.

(56) References Cited

U.S. PATENT DOCUMENTS

| 6,101,188 A | 8/2000 | Sekine et al. |
| 7,870,298 B2 | 1/2011 | Shima et al. |

(Continued)

FOREIGN PATENT DOCUMENTS

| JP | 10-93614 | 4/1998 |
| JP | 2007-109040 | 4/2007 |

(Continued)

OTHER PUBLICATIONS

International Search Report mailed Mar. 6, 2012, in corresponding International Patent Application No. PCT/JP2012/052529.

(Continued)

*Primary Examiner* — Andy Ho
(74) *Attorney, Agent, or Firm* — Staas & Halsey LLP

(57) ABSTRACT

An information processing apparatus extracts information for identifying virtual machines as a transmission source and a transmission destination from a packet corresponding to a communication request when the communication request from a virtual machine is acquired, and determines whether the extracted virtual machines as the transmission source and the transmission destination use the same virtual bridge based on a first management table and a second management table. The information processing apparatus, when it is determined that the same virtual bridge is used, executes processing of the virtual bridge based on the information relating to the virtual bridge and relays the packet corresponding to the communication request to the virtual machine as the transmission destination, and notifies the first virtual machine relaying the virtual network interface of the virtual machine as the transmission source of arrival of the packet when it is determined that the same virtual bridge is not used.

7 Claims, 11 Drawing Sheets

(56) References Cited

U.S. PATENT DOCUMENTS

| | | | |
|---|---|---|---|
| 7,937,701 B2* | 5/2011 | Kinney | G06F 9/544 |
| | | | 713/300 |
| 7,984,449 B2* | 7/2011 | Baran | G06F 9/544 |
| | | | 718/1 |
| 8,146,081 B2* | 3/2012 | Mizuno | G06F 9/4881 |
| | | | 718/1 |
| 8,533,344 B2* | 9/2013 | Nguyen | G06F 17/30893 |
| | | | 709/226 |
| 2010/0064301 A1 | 3/2010 | Suzuki | |
| 2011/0314469 A1 | 12/2011 | Qian et al. | |
| 2011/0320632 A1 | 12/2011 | Karino | |
| 2012/0204051 A1 | 8/2012 | Murakami et al. | |
| 2013/0047157 A1 | 2/2013 | Suzuki | |
| 2013/0152075 A1* | 6/2013 | Cardona | G06F 9/45558 |
| | | | 718/1 |

FOREIGN PATENT DOCUMENTS

| | | |
|---|---|---|
| JP | 2007-193429 | 8/2007 |
| JP | 2010-66931 | 3/2010 |
| JP | 2011-82799 | 4/2011 |
| JP | 2012-3747 | 1/2012 |
| JP | 2012-15632 | 1/2012 |
| JP | 2013-41409 | 2/2013 |

OTHER PUBLICATIONS

Extended European Search Report dated Sep. 2, 2015 in corresponding European Patent Application No. 12867375.3.

Kallahalla et al., "SoftUDC: A Software-Based Data Center for Utility Computing", IEEE Computer Society, Nov. 2004, pp. 38-46.

* cited by examiner

FIG.4

| MAC ADDRESS | DEVICE ID |
|---|---|
| MAC (A) | vif1.0 |
| MAC (B) | vif2.0 |
| MAC (C) | vif3.0 |
| MAC (D) | vif4.0 |

FIG.5

| GUEST ID | DEVICE ID | BRIDGE DEVICE ADDRESS |
|---|---|---|
| 0 | vif1.0 | net_deviceA |
| 0 | vif2.0 | net_deviceA |
| 1 | vif3.0 | net_deviceB |
| 1 | vif4.0 | net_deviceB |

FIG.6

| GUEST ID | INTERRUPT VECTOR | BRIDGE HANDLER | STRUCTURE IDENTIFIER | GUEST PAGE TABLE |
|---|---|---|---|---|
| 0 | 0 | br_netdev_ops0 | BRIDGE | PT0 |
| 1 | 0 | br_netdev_ops1 | BRIDGE | PT1 |

| GUEST ID | DEVICE ID | BRIDGE DEVICE ADDRESS | BUFFER QUEUE |
|---|---|---|---|
| 0 | vif1.0 | net_deviceA | queue1 |
| 0 | vif2.0 | net_deviceA | queue2 |
| 1 | vif3.0 | net_deviceB | queue3 |
| 1 | vif4.0 | net_deviceB | queue4 |

COMPUTER-READABLE RECORDING MEDIUM, VIRTUAL MACHINE CONTROL METHOD AND INFORMATION PROCESSING APPARATUS

CROSS-REFERENCE TO RELATED APPLICATION

This application is a continuation application of International Application PCT/JP2012/052529, filed on Feb. 3, 2012, and designating the U.S., the entire contents of which are incorporated herein by reference.

FIELD

The present invention relates to a computer program for virtual machine control, a method for virtual machine control, and an information processing apparatus.

BACKGROUND

Conventionally known have been server virtualization technologies of operating a virtual server called a virtual machine (VM) on a physical server of an information processing apparatus or the like. The physical server operates software called a virtual machine monitor (VMM) or the like that executes various controls relating to the VM, such as generation of the VM. In general, an operating system (OS) operating on the VM is called a guest OS.

Known examples of the VMM include hypervisors. The hypervisors are classified into monolithic hypervisors and microkernel hypervisors.

The monolithic hypervisor has a configuration in which a device driver is implemented on a hypervisor layer. The monolithic hypervisor executes the device driver, executes processing equivalent to a layer 2 switch, and so on. The monolithic hypervisor can, therefore, process communication between the guest OSs at high speed in some cases but may cause the communication to be unstable.

The microkernel hypervisor has a configuration in which a management OS having special authority different from that of the guest OS is implemented in addition to the hypervisor layer. The management OS is one guest OS operating on the VM and manages the device driver. The microkernel hypervisor, therefore, processes input/output (I/O) generated on a guest OS through the device driver that is managed by the management OS.

Patent Literature 1: Japanese Laid-open Patent Publication No. 2007-109040
Patent Literature 2: Japanese Laid-open Patent Publication No. 2007-193429

The conventional technique, however, has a problem that communication between the guest OSs is not made at high speed.

For example, when the microkernel hypervisor is employed, bridge processing with the management OS is performed in order to execute communication between the guest OSs. This leads to waiting for switching of a context of the management OS and generates overhead, resulting in increased time taken for the communication between the guest OSs.

SUMMARY

According to an aspect of the embodiments, a computer-readable recording medium stores therein a virtual machine control program that causes an information processing apparatus to execute a process. The process includes operating a plurality of virtual machines on the information processing apparatus, the plurality of virtual machines including a first virtual machine having a function of achieving communication between virtual machines; holding a first management table in which information for identifying virtual machines and information for identifying virtual network interfaces of the virtual machines correspond to each other, and a second management table including information for identifying the first virtual machine, information for identifying virtual network interfaces of two virtual machines relayed by the first virtual machine, and information relating to a virtual bridge that is used by the first virtual machine; extracting information for identifying virtual machines as a transmission source and a transmission destination from a packet corresponding to a communication request when the communication request from a virtual machine is acquired, and first determining whether the extracted virtual machines as the transmission source and the transmission destination use the same virtual bridge based on the first management table and the second management table; when it is determined that the same virtual bridge is used, executing processing of the virtual bridge based on the information relating to the virtual bridge and relaying the packet corresponding to the communication request to the virtual machine as the transmission destination; and when it is determined that the same virtual bridge is not used, notifying the first virtual machine relaying the virtual network interface of the virtual machine as the transmission source of arrival of the packet.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a view illustrating an example of pieces of information that are stored in an MAC management table 32.

FIG. 5 is a view illustrating an example of pieces of information that are stored in a guest ID management table 33.

FIG. 6 is a view illustrating an example of pieces of information that are stored in a handler management table 34.

DESCRIPTION OF EMBODIMENTS

Hereinafter, embodiments of a computer program for virtual machine control, a method for virtual machine control, and an information processing apparatus according to the present invention are described in detail with reference to the drawings. The present invention is not limited to these embodiments.

First Embodiment

Figure 1:
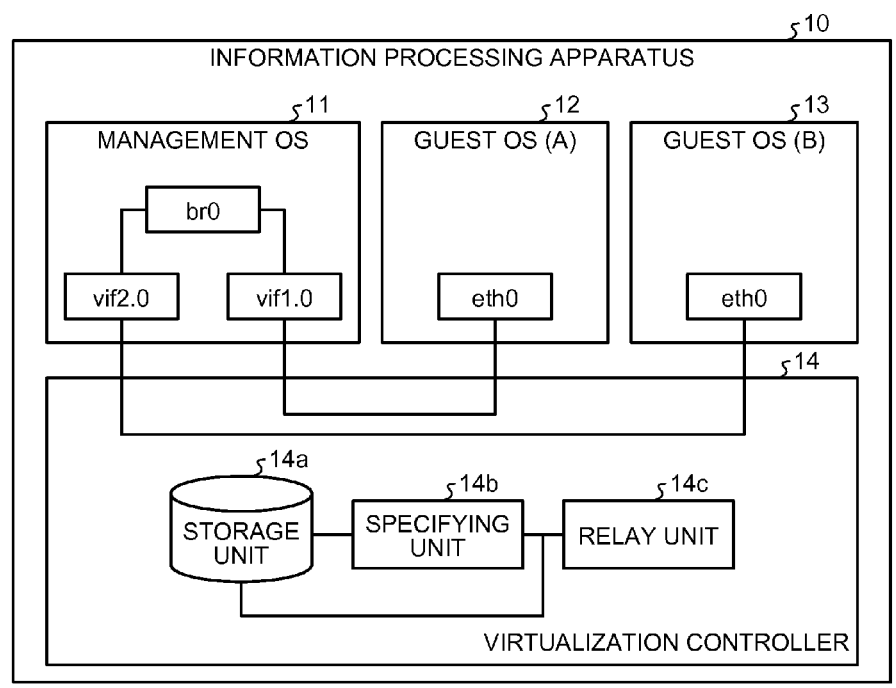
FIG. 1 is a diagram illustrating an example of the overall configuration of an information processing apparatus according to a first embodiment.

FIG. 1 is a diagram illustrating an example of the overall configuration of an information processing apparatus according to a first embodiment. As illustrated in FIG. 1, an information processing apparatus 10 operates a virtualization controller 14, and operates a management operating system (OS) 11, a guest OS (A) 12, and a guest OS (B) 13 as virtual machines (VMs). The number of guest OSs as illustrated in FIG. 1 is an example, and the information processing apparatus 10 can operate any desired number of guest OSs. The embodiment is described using an example where the VM is operated with a microkernel hypervisor.

The management OS 11 is one of the guest OSs for which the virtualization controller 14 executes various controls, and is the VM that has authority different from those of the other guest OSs. For example, the management OS 11 provides a virtual bridge device that relays communication between the guest OS (A) 12 and the guest OS (B) 13. To be specific, the management OS 11 has "vif1.0" and "vif2.0" as virtual network interfaces called net-back or the like and has "br0" as a bridge interface connecting "vif1.0" and "vif2.0".

The guest OS (A) 12 is one of the guest OSs for which the virtualization controller 14 executes various controls, and is the VM having "eth0" as the virtual network interface called net-front or the like. "eth0" is connected to "vif1.0" of the management OS 11.

The guest OS (B) 13 is one of the guest OSs for which the virtualization controller 14 executes various controls, and is the VM having "eth0" as the virtual network interface called net-front or the like. "eth0" is connected to "vif2.0" of the management OS 11.

The virtualization controller 14 executes software such as a hypervisor to provide a virtual space in which the VM is operated, and executes various controls, such as generation and deletion of the VM. The virtualization controller 14 includes a storage unit 14a, a specifying unit 14b, and a relay unit 14c.

The storage unit 14a stores therein a storage destination of a computer program for executing relay processing of relaying communication between a guest OS and another guest OS. For example, the storage unit 14a stores therein a storage destination of a computer program for operating a virtual bridge device configured by "vif1.0", "vif2.0", and "br0". Examples of the storage destination include address information.

The specifying unit 14b specifies the storage destination of the computer program for executing the relay processing from the storage unit 14a when any of the guest OSs operating on the information processing apparatus 10 transmits a packet. The relay unit 14c reads out the computer program from the storage destination specified by the specifying unit 14b and executes it, and relays the packet transmitted from the guest OS to a virtual machine as a destination.

Figure 2:
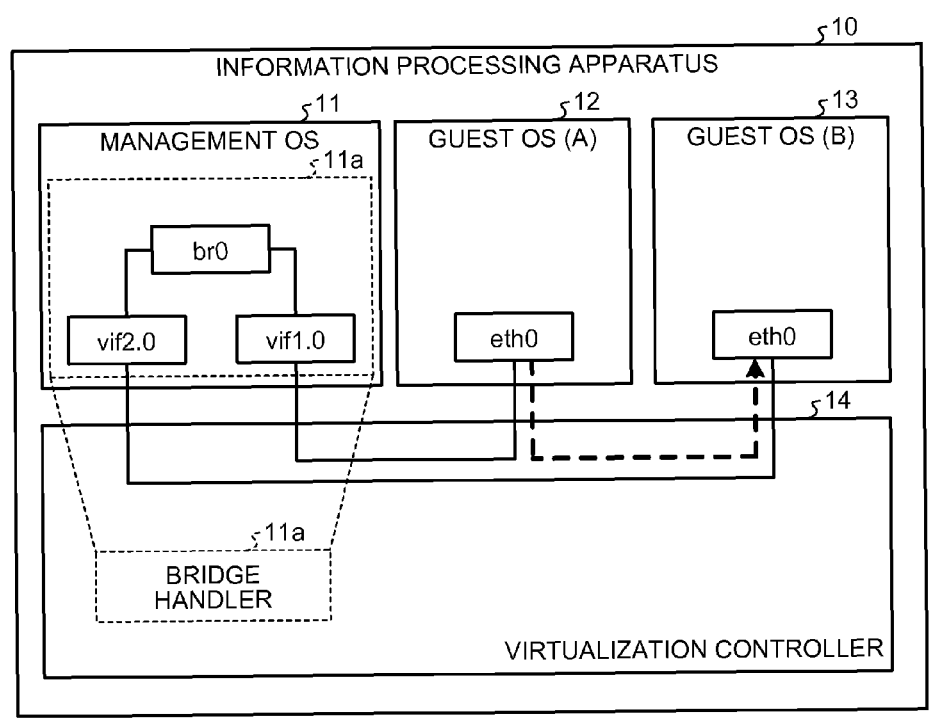
FIG. 2 is a diagram illustrating an example where a virtualization controller 14 operates a virtual bridge.

An example of processing that is executed by the virtualization controller 14 is described with reference to FIG. 2. FIG. 2 is a diagram illustrating an example where the virtualization controller 14 operates the virtual bridge device. The configurations of the VM and the like that are operated by an information processing apparatus as illustrated in FIG. 2 are the same as those in FIG. 1. An example in which the guest OS (A) 12 transmits a packet to the guest OS (B) 13 is described.

First, general communication between the guest OSs is described. The guest OS (A) 12 transmits a packet of which destination is set to the IP address of the guest OS (B) 13. The net-front "eth0" of the guest OS (A) 12 notifies the net-back "vif1.0" of the management OS 11 of arrival of the packet. Subsequently, the management OS 11 reads the packet having arrived at the net-back "vif1.0" and writes the packet into the net-back "vif2.0" through "br0". The net-back "vif2.0" notifies the net-front "eth0" of the guest OS (B) 13 of arrival of the packet. In this manner, the guest OS (B) 13 receives the packet transmitted from the guest OS (A) 12 through the virtual bridge of the management OS 11.

The following describes an example of transmission and reception of a packet that are executed by the information processing apparatus in the first embodiment with reference to FIG. 2. The guest OS (A) 12 transmits a packet of which destination is set to the IP address of the guest OS (B) 13. The net-front "eth0" of the guest OS (A) 12 notifies the virtualization controller 14 of arrival of the packet at the net-back "vif1.0" of the management OS 11. The virtualization controller 14 specifies a storage destination of a bridge handler 11a from the storage unit 14a. The bridge connection between the net-backs "vif1.0" and "vif2.0" through "br0" configures the bridge handler 11a. The virtualization controller 14 operates the bridge handler 11a read from the specified storage destination, instead of the management OS 11. The virtualization controller 14 notifies the net-front "eth0" of the guest OS (B) 13 that is mapped to the net-back of arrival of the packet. In this manner, the guest OS (B) 13 receives the packet transmitted from the guest OS (A) 12 without the management OS 11 interposed therebetween.

Thus, the virtualization controller 14 of the information processing apparatus 10 operates the bridge handler 11a providing the virtual bridge device, instead of the management OS 11. That is to say, the virtualization controller 14 can read and operate the bridge handler 11a that has operated in the kernel of the management OS 11, using the context of the hypervisor such as the virtualization controller 14. As a result, the information processing apparatus 10 can eliminate communication between the guests OS and the management OS, thereby speeding up the communication between the guests OS.

Second Embodiment

Next, an information processing apparatus according to a second embodiment is described. In the second embodiment, the configuration, the procedure of processing, and the like of the information processing apparatus in the second embodiment are described.

Configuration of Information Processing Apparatus

Figure 3:
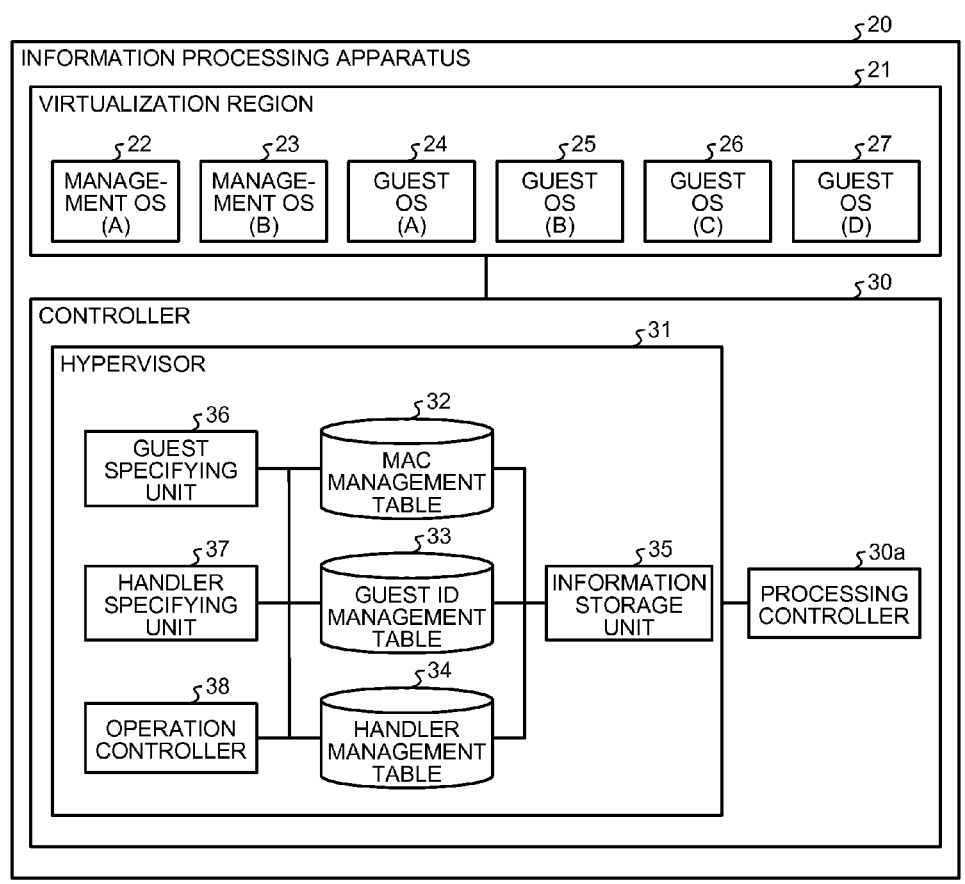
FIG. 3 is a functional block diagram illustrating the configuration of an information processing apparatus according to a second embodiment.

FIG. 3 is a functional block diagram illustrating the configuration of the information processing apparatus in the second embodiment. As illustrated in FIG. 3, an information processing apparatus 20 includes a virtualization region 21 and a controller 30. The functional units as illustrated in FIG.

3 are merely examples, and the information processing apparatus 20 may include a storage unit such as a memory, an input/output interface, and a communication interface, for example, as units other than the functional units as illustrated in FIG. 3.

The virtualization region 21 is a region that is managed by a hypervisor 31 of the controller 30, and any desired number of VMs can be operated in the virtualization region 21. In FIG. 3, a management OS (A) 22, a management OS (B) 23, a guest OS (A) 24, a guest OS (B) 25, a guest OS (C) 26, and a guest OS (D) 27 are operated as the VMs.

Here, "0" as a guest ID for identifying the VM is assigned to the management OS (A) 22, and "1" as the guest ID is assigned to the management OS (B) 23. Furthermore, media access control (MAC) (A) as an MAC address is set to the guest OS (A) 24, and MAC (B) as the MAC address is set to the guest OS (B) 25. In the same manner, MAC (C) as the MAC address is set to the guest OS (C) 26, and MAC (D) as the MAC address is set to the guest OS (D) 27.

The management OS (A) 22 has a net-back "vif1.0" and a net-back "vif2.0" as virtual network interfaces and "br0" as a bridge interface connecting "vif1.0" and "vif2.0". The management OS (B) 23 has a net-back "vif3.0" and a net-back "vif4.0" as the virtual network interfaces and "br1" as a bridge interface connecting "vif3.0" and "vif4.0".

The guest OS (A) 24 is the VM having a net-front "eth0" as the virtual network interface. "eth0" of the guest OS (A) 24 is connected to "vif1.0" of the management OS (A) 22. The guest OS (B) 25 is the VM having a net-front "eth0" as the virtual network interface. "eth0" of the guest OS (B) 25 is connected to "vif2.0" of the management OS (A) 22. The guest OS (C) 26 is the VM having a net-front "eth0" as the virtual network interface. "eth0" of the guest OS (C) 26 is connected to "vif3.0" of the management OS (B) 23. The guest OS (D) 27 is the VM having a net-front "eth0" as the virtual network interface. "eth0" of the guest OS (D) 27 is connected to "vif4.0" of the management OS (B) 23.

That is to say, the management OS (A) 22 provides a virtual bridge device that relays communication between the guest OS (A) 24 and the guest OS (B) 25. The management OS (B) 23 provides a virtual bridge device that relays communication between the guest OS (C) 26 and the guest OS (D) 27.

The hypervisor 31 assigns a virtual processor and a virtual memory to each of the guest OSs and the management OSs operating in the virtualization region 21. Each of the guest OSs and the management OSs operates as the VM with the virtual processor and the virtual memory and executes various kinds of processing. The virtual memory is achieved by assigning a particular region in a memory of the information processing apparatus 20 as a memory that is used by the guest OSs or the management OSs. The virtual processor is achieved by assigning a particular processing capability of a processor of the information processing apparatus 20 as a processor that is used by the guest OSs or the management OSs.

The controller 30 is a processing unit that includes a processing controller 30a and the hypervisor 31 and controls communication between the guest OSs using these components. For example, the controller 30 is an electronic circuit such as a central processing unit (CPU). The controller 30 may include an internal memory and the like.

The processing controller 30a is a processing unit that executes pieces of processing other than those relating to the guest OSs and the management OSs. For example, the processing controller 30a stops activation of an OS that is implemented on the information processing apparatus 20 and stops activation of the hypervisor 31.

The hypervisor 31 is a processing unit that executes pieces of processing relating to the VMs, such as generation and deletion of the VMs, and controls communication between the guest OS. The hypervisor 31 includes an MAC management table 32, a guest ID management table 33, a handler management table 34, an information storage unit 35, a guest specifying unit 36, a handler specifying unit 37, and an operation controller 38. The tables are provided in a storage device such as a memory and are updated by a manager or the information storage unit 35 described later.

The MAC management table 32 stores therein pieces of information for specifying net-backs mapped to the net-fronts of the guest OSs so as to correspond to the MAC addresses of the respective guest OSs. FIG. 4 is a view illustrating an example of the pieces of information that are stored in the MAC management table 32. As illustrated in FIG. 4, the MAC management table 32 stores therein "MAC address" and "device ID" in a correspondence manner. "MAC address" stored therein indicates the MAC addresses set to the respective guests OS. "Device ID" indicates information for specifying the net-backs of the management OSs. For example, the names or identifiers of the net-backs or the device IDs or the like that are used by the net-backs are stored as "device ID". FIG. 4 illustrates an example where the identifiers of the net-backs are stored as "device ID".

FIG. 4 indicates the following. That is, the guest OS (A) 24 having the MAC (A) is connected to the net-back "vif1.0" of the management OS (A) 22. The guest OS (B) having the MAC (B) is connected to the net-back "vif2.0" of the management OS (A) 22. The guest OS (C) 26 having the MAC (C) is connected to the net-back "vif3.0" of the management OS (B) 23. The guest OS (D) 27 having the MAC (D) is connected to the net-back "vif4.0" of the management OS (B) 23.

The guest ID management table 33 stores therein pieces of information relating to the virtual bridge devices that are used by the respective management OSs. FIG. 5 is a view illustrating an example of the pieces of information that are stored in the guest ID management table 33. As illustrated in FIG. 5, the guest ID management table 33 stores therein "guest ID", "device ID", and "bridge device address".

"Guest ID" stored therein indicates identifiers for identifying the management OSs. "Device ID" indicates identifiers for identifying the virtual network interfaces that are used by the management OSs. "Bridge device address" indicates pieces of address information indicating the virtual bridge devices themselves that are used by the management OSs, and initial addresses of structures are stored as "Bridge device address", for example. The guest ID management table 33 may store therein a correspondence table of the MAC addresses of the net-fronts and the names of the net-backs. Furthermore, the identifiers of the net-fronts or the like may be used as the device ID.

FIG. 5 indicates the following. That is, the virtual bridge device having the net-backs "vif1.0" and "vif2.0" of the management OS (A) 22 having the guest ID of "0" is stored at a position of which initial address of the structure is "net_deviceA". In the same manner, the virtual bridge device having the net-backs "vif3.0" and "vif4.0" of the management OS (B) 23 having the guest ID of "1" is stored at a position of which initial address of the structure is "net_deviceB".

The handler management table 34 stores therein storage destinations of the bridge handlers that are executed by the respective management OSs. That is to say, the handler management table 34 stores therein entry points of the virtual bridge devices. FIG. 6 is a view illustrating an example of pieces of information that are stored in the handler management table 34. As illustrated in FIG. 6, the handler management table 34 stores therein "guest ID", "interrupt vector", "bridge handler", "structure identifier", and "guest page table" in a correspondence manner.

"Guest ID" stored therein indicates identifiers for identifying the management OSs. "Interrupt vector" indicates identifiers for identifying interrupt factors. "Bridge handler" indicates the initial addresses of storage destinations in which the bridge handlers are stored in a format of a physical address that is used by the management OSs, in other words, in an address format of a virtual address space that is provided by the hypervisor 31. "Structure identifier" indicates pieces of information for specifying the types of the structures. "Guest page table" indicates page tables that are used for conversion into the virtual space of the management OSs, and indicates the initial addresses of the physical address space that is held by the management OSs, that is, the initial address of the virtual address space that is provided by the hypervisor 31.

FIG. 6 indicates the following. That is, the bridge handler that is operated by the management OS (A) 22 is stored in a br_netdev_ops0 structure. When an interrupt having the interrupt vector of "0" is generated on the management OS (A) 22 having the guest ID of "0", the physical address "br_netdev_ops0" of the management OS (A) 22 is converted using PT0 into the virtual address. Furthermore, the bridge handler that is operated by the management OS (B) 23 is stored in a br_netdev_ops1 structure. When an interrupt having the interrupt vector of "0" is generated on the management OS (B) 23 having the guest ID of "1", the physical address "br_netdev_ops1" of the management OS (B) 23 is converted using PT1 into the virtual address.

Thus, when the address of a structure is registered, a structure indicating that the address is for a structure is registered in the handler management table 34 in order to distinguish the address from the address of a normal function. As a result, the hypervisor 31 can specify the storage destinations of the entire bridge handlers. As the structure identifiers, simple flags or offsets to members of the structures may be stored. Moreover, packet communication between the guest OSs corresponds to the interrupt having the interrupt vector of "0", as an example.

The information storage unit 35 is a processing unit that stores various kinds of information in the MAC management table 32, the guest ID management table 33, and the handler management table 34. The information storage unit 35 may automatically acquire and store setting information and/or address information of the management OS from the memory, the management OS, or the like, and may store information received from the manager or the like.

For example, when a guest OS is created or the guest OS is operated, the information storage unit 35 stores the MAC address of the guest OS and the net-back of the management OS to which the guest OS is connected in the MAC management table 32 in a correspondence manner. Furthermore, when a management OS is created or the management OS is operated, the information storage unit 35 stores the guest ID, the device ID, and the bridge device address in the guest ID management table 33 in a correspondence manner. In addition, when a management OS is created or the management OS is operated, the information storage unit 35 stores the guest ID, the interrupt vector, the bridge handler, the structure identifier, and the guest page table in the handler management table 34 in a correspondence manner.

The guest specifying unit 36 is a processing unit that when the guest OS transmits a packet, specifies the address of a bridge device relaying the packet and the management OS operating the bridge device. An example is described below where the guest OS (A) 24 transmits a packet to the guest OS (B) 25.

In this case, the guest specifying unit 36 specifies the MAC address "MAC (A)" of the guest OS (A) 24 as the transmission source and the MAC address "MAC (B)" of the guest OS (B) 25 as the destination from a header and the like of the transmitted packet. The guest specifying unit 36 specifies the device ID "vif1.0" corresponding to the specified "MAC (A)" from the MAC management table 32. In the same manner, the guest specifying unit 36 specifies the device ID "vif2.0" corresponding to the specified "MAC (B)" from the MAC management table 32.

Subsequently, the guest specifying unit 36 specifies the guest ID "0" and the bridge address "net_deviceA" corresponding to "vif1.0" from the guest ID management table 33. In the same manner, the guest specifying unit 36 specifies the device ID "0" and the bridge address "net_deviceA" corresponding to "vif2.0" from the guest ID management table 33. In this case, the guest specifying unit 36 determines whether the specified bridge addresses "net_deviceA" are identical. That is to say, the guest specifying unit 36 determines whether the bridge device to which the guest OS as the transmission source is connected and the bridge device to which the guest OS as the destination is connected are identical.

Subsequently, the guest specifying unit 36 notifies the handler specifying unit 37 of the guest ID and the bridge address specified from the MAC address as the destination and the determination result. The guest specifying unit 36 notifies the handler specifying unit 37 of "0" as the interrupt vector indicating that the guest OS (A) 24 has transmitted the packet to the guest OS (B) 25.

The handler specifying unit 37 is a processing unit that specifies a bridge handler calling a virtual bridge device relaying a transmitted packet. To be specific, the handler specifying unit 37 specifies address information of the storage destination of the bridge handler that executes the packet relay processing in order to deliver the transmitted packet to the destination.

In the above-mentioned example, the handler specifying unit 37 acquires the interrupt vector "0", the guest ID "0", the bridge address "net_deviceA", and the determination result from the guest specifying unit 36. The handler specifying unit 37 refers to the handler management table 34 using the interrupt vector "0", the guest ID "0", and the bridge address "net_deviceA" as keys to specify the bridge handler "br_netdev_ops0", the structure identifier "BRIDGE", and the guest page table "PT0". Subsequently, the handler specifying unit 37 notifies the operation controller 38 of the pieces of specified information and the bridge address.

The handler specifying unit 37 may execute the above-mentioned pieces of processing when the determination result from the guest specifying unit 36 is "identical". When the determination result from the guest specifying unit 36 is "non-identical", the handler specifying unit 37 can notify the management OS of the transmission of the packet from the guest OS, without executing the above-mentioned pieces of processing.

The operation controller 38 is a processing unit that operates the bridge handler. To be specific, the operation controller 38 reads out the bridge handler that has operated in the kernel of the management OS using the context of the hypervisor 31 and operates it.

In the above-mentioned example, the operation controller 38 acquires the bridge handler "br_netdev_ops0", the structure identifier "BRIDGE", the guest page table "PT0", and the bridge address "net_deviceA" from the handler specifying unit 37. The operation controller 38 converts "br_netdev_ops0" from the physical address of the physical address space that is managed by the management OS (A) 22 into a logical address of a logical address space that is managed by the management OS (A) 22, using the guest page table "PT0". Subsequently, the operation controller 38 reads out the bridge handler from the converted virtual address using the bridge address "net_deviceA" as an argument, and operates it. In this manner, the operation controller 38 notifies the guest OS (B) 25 as the destination of arrival of the packet at the net-back "eth0" in the operated bridge handler.

[Procedure of Processing]

The following describes the procedure of pieces of processing executed by the information processing apparatus 20. The initialization processing and the packet relay processing are described.

(Initialization Processing)

Figure 7:
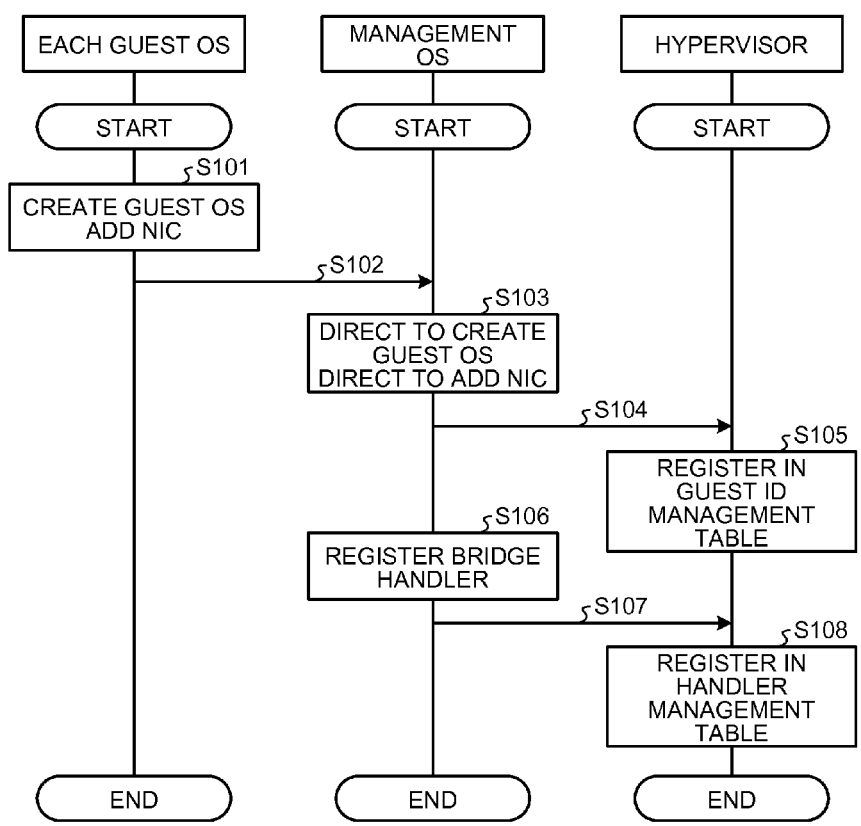
FIG. 7 is a sequence diagram illustrating the procedure of initialization processing executed by an information processing apparatus 20 in the second embodiment.

FIG. 7 is a sequence diagram illustrating the procedure of the initialization processing executed by the information processing apparatus 20 in the second embodiment. As illustrated in FIG. 7, when an operator, a manager, or the like creates a guest OS in the virtualization region 21 or a network interface card (NIC) device for the guest OS is added (S101 and S102), the management OS executes S103 and S104. That is to say, the management OS outputs a creation direction of the guest OS or an addition direction of the NIC to the hypervisor 31.

Subsequently, the information storage unit 35 of the hypervisor 31 registers a record storing information corresponding to the created guest OS or the added NIC device in the guest ID management table 33 (S105). In this process, the information storage unit 35 also registers the record storing the information corresponding to the created guest OS or the added NIC device in the MAC management table 32.

Subsequently, the management OS outputs a registration direction of the bridge handler to the hypervisor 31 (S106 and S107). That is to say, the management OS detects connection between the net-front of the generated guest OS and the net-back of the management OS and establishes a virtual bridge device. The management OS notifies the hypervisor 31 of the storage destination of a computer program for operating the established virtual bridge device.

Subsequently, the information storage unit 35 of the hypervisor 31 registers the notified storage destination of the computer program from the management OS in the handler management table 34 (S108). In this process, the information storage unit 35 acquires the guest ID of the management OS, the interrupt vector, the guest page table, and the like from the management OS and the like, and registers them in the handler management table 34 together with the storage destination of the computer program.

(Relay Processing)

Figure 8:
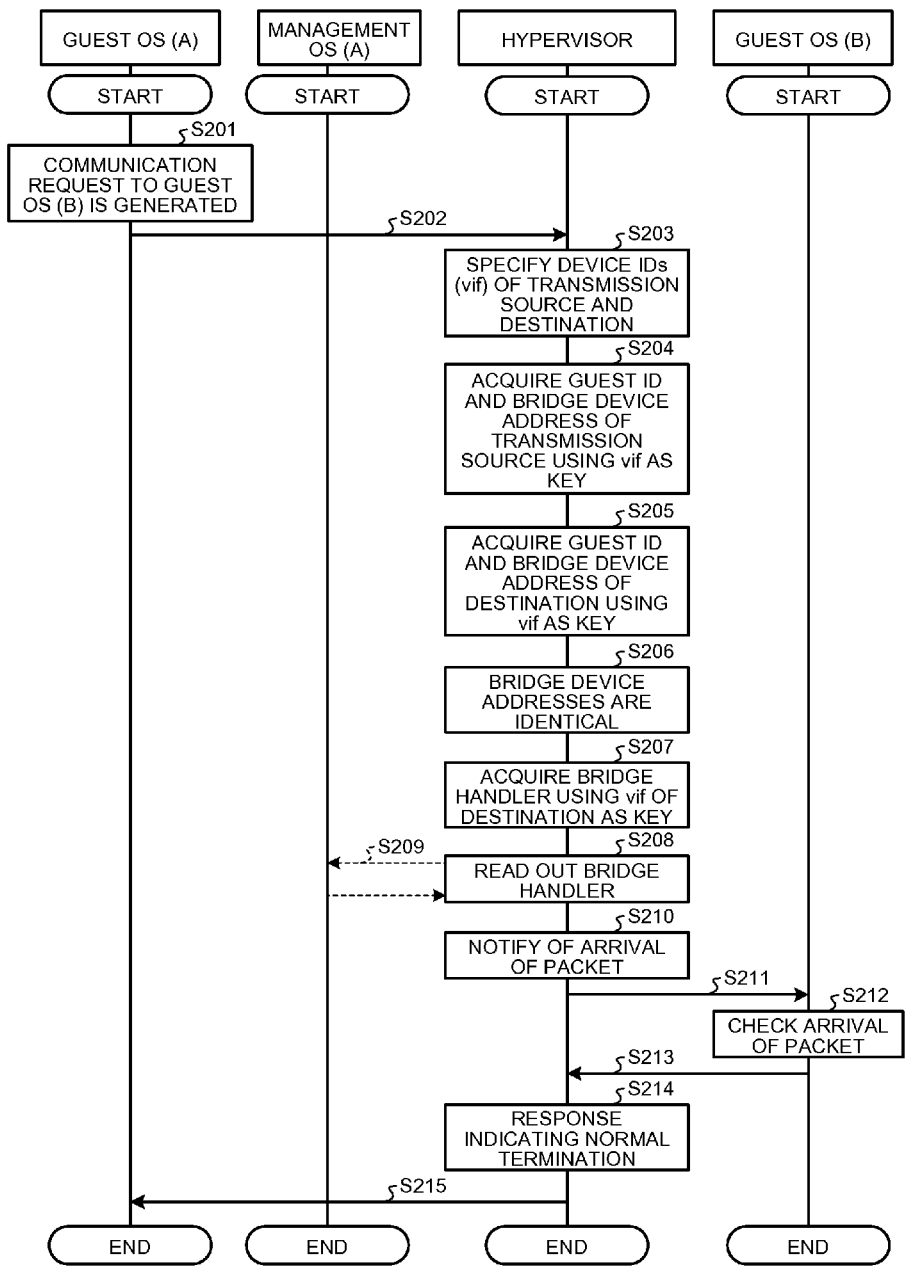
FIG. 8 is a sequence diagram illustrating the procedure of relay processing executed by the information processing apparatus 20 in the second embodiment.

FIG. 8 is a sequence diagram illustrating the procedure of the relay processing executed by the information processing apparatus 20 in the second embodiment. As illustrated in FIG. 8, when a communication request to the guest OS (B) 25 is generated (S201), the guest OS (A) 24 notifies the hypervisor 31 of the generation of the communication request (S202). That is to say, "eth0" as the virtual interface of the guest OS (A) 24 notifies the hypervisor 31 of arrival of a packet at the net-back "vif1.0" of the management OS (A) 22 that is connected with "eth0".

Subsequently, the guest specifying unit 36 of the hypervisor 31 executes S203 based on the packet having arrived at the net-back "vif1.0". That is to say, the guest specifying unit 36 extracts the MAC address of the guest OS (A) 24 as the transmission source and the MAC address of the guest OS (B) 25 as the destination from the packet. The guest specifying unit 36 specifies the device ID of the net-back that is connected to the guest OS (A) 24 as the transmission source and the device ID of the net-back that is connected to the guest OS (B) 25 as the destination with reference to the MAC management table 32 using the respective MAC addresses as keys.

Subsequently, the guest specifying unit 36 acquires the guest ID and the bridge device address corresponding to the device ID of the transmission source from the guest ID management table 33 using the device ID of the transmission source as a key (S204). In the same manner, the guest specifying unit 36 acquires the guest ID and the bridge device address corresponding to the device ID of the destination from the guest ID management table 33 using the device ID of the destination as a key (S205).

Subsequently, the guest specifying unit 36 determines whether the bridge device address specified at S204 and the bridge device address specified at S205 are identical (S206). It is herein assumed that they are identical.

After that, the handler specifying unit 37 acquires the bridge handler, the structure identifier, and the guest page table from the handler management table 34 using the device ID of the net-back that is connected to the guest OS (B) 25 as the destination as a key (S207).

Subsequently, the operation controller 38 reads out the bridge handler from the specified bridge handler address using the specified bridge device address as an argument, and operates it (S208 and S209).

Subsequently, the operation controller 38 notifies the guest OS (B) 25 of arrival of the packet (S210 and S211), the guest OS (B) 25 having the net-front "eth0" mapped to the net-back "vif2.0" that is bridge-connected to the net-back "vif1.0" through "br0".

The guest OS (B) 25 checks the arrival of the packet, that is, reception of the packet (S212), and notifies the hypervisor 31 of the normal reception (S213). The operation controller 38 of the hypervisor 31 notifies the guest OS (A) 24 as the transmission source of a response indicating that the packet has been received by the destination normally (S214 and S215).

In this manner, in the information processing apparatus 20 in the second embodiment, the hypervisor 31 can receive network information set on the management OS, store structure information of the virtual bridge device and the handler thereof to be called, and call the registered handler. This can call the processing of the management OS directly without waiting for operation of the management OS, thereby achieving communication between the guests at high speed.

Third Embodiment

Although the example where the hypervisor operates the entire bridge handler configured by the net-backs and the bridge interface instead of the management OS has been described in the second embodiment, the configuration is not limited thereto. For example, the hypervisor can execute the packet relay processing by storing a packet in a queuing buffer of the net-back that is connected to the guest OS as the destination. In a third embodiment, an example is described where the hypervisor executes a queuing handler storing the packet in the queuing buffer instead of the management OS.

[Overall Configuration]

Figures 9, 10:
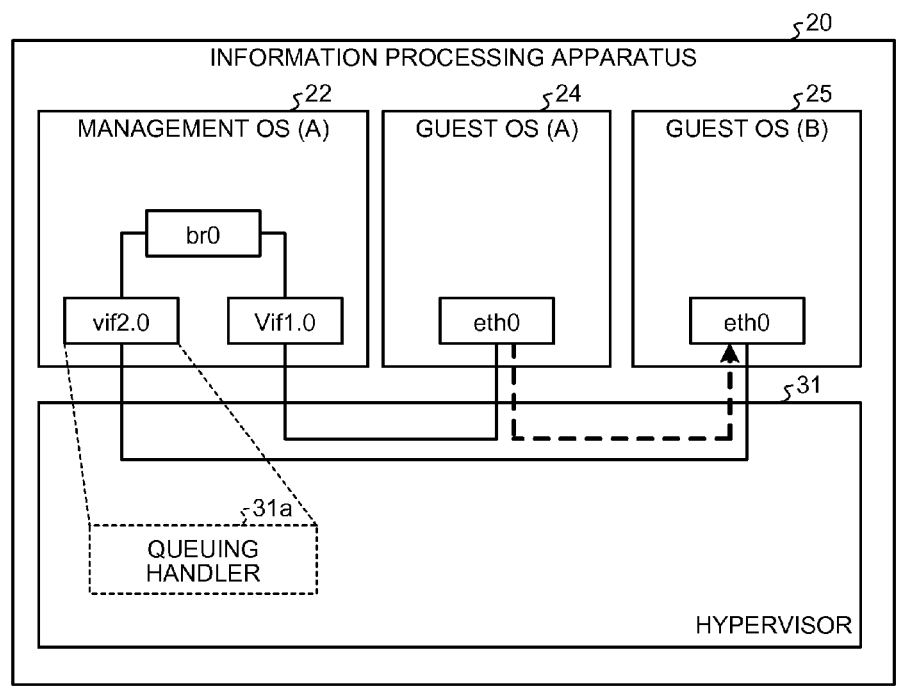
FIG. 9 is a diagram illustrating an example of the overall configuration of an information processing apparatus 20 according to a third embodiment.
FIG. 10 is a view illustrating an example of pieces of information that are stored in a guest ID management table 33 in the third embodiment.

FIG. 9 is a diagram illustrating an example of the overall configuration of an information processing apparatus 20 in the third embodiment. As illustrated in FIG. 9, the information processing apparatus 20 in the third embodiment has the same configuration as that of the information processing apparatus in the second embodiment. In FIG. 9, a part of the information processing apparatus 20 in the second embodiment as illustrated in FIG. 3 is extracted and illustrated. The information processing apparatus 20 in the third embodiment holds tables that are the same as those in the second embodiment. The third embodiment is different from the first embodiment and the second embodiment in that the initial addresses of buffer queues are stored in the guest ID management table 33. FIG. 10 is a view illustrating an example of pieces of information that are stored in the guest ID management table 33 in the third embodiment.

As illustrated in FIG. 10, the guest ID management table 33 in the third embodiment stores therein "guest ID", "device ID", "bridge device address", and "buffer queue" in a correspondence manner. The "guest ID", "device ID", and "bridge device address" stored therein are the same as those in FIG. 5, and detailed description thereof is omitted. "Buffer queue" indicates the initial addresses of buffers storing packets and forming queues. The guest ID management table 33 does not always store "bridge device address".

An example described with reference to FIG. 10 indicates the following. That is, the virtual bridge device having the net-backs "vif1.0" and "vif2.0" of the management OS (A) 22 having the guest ID of "0" is stored at a position of which initial address of the structure is "net_deviceA". In addition, the address of the buffer storing a packet that has arrived at the net-back "vif1.0" is "queue1". In the same manner, the virtual bridge device having the net-backs "vif3.0" and "vif4.0" of the management OS (B) 23 having the guest ID of "1" is stored at a position of which initial address of the structure is "net_deviceB". In addition, the address of the buffer storing the packet that has arrived at the net-back "vif3.0" is "queue3".

An example is described where the guest OS (A) 24 transmits a packet to the guest OS (B) 25 in this configuration. The guest OS (A) 24 transmits a packet of which destination is set to the IP address of the guest OS (B) 25. The net-front "eth0" of the guest OS (A) 24 notifies the hypervisor 31 of arrival of the packet at the net-back "vif1.0" of the management OS (A) 22.

As illustrated in FIG. 9, the hypervisor 31 specifies the storage position of a queuing handler 31a of the net-back "vif2.0" that is bridge-connected to the net-back "vif1.0" at which the packet has arrived. That is to say, the hypervisor 31 operates the queuing handler 31a stored in the handler management table 34 using the buffer queue stored in the guest ID management table 33 as an argument, and reads out a queuing buffer. The hypervisor 31 writes the transmitted packet into the read-out queuing buffer of the net-back "vif2.0". The hypervisor 31 notifies the net-front "eth0" of the guest OS (B) 25 mapped to the net-back of arrival of the packet. In this manner, the guest OS (B) 25 receives the packet transmitted from the guest OS (A) 24 by reading the packet from the queuing buffer corresponding to the net-back "vif2.0", without the management OS (A) 22 interposed therebetween.

[Procedure of Processing]

The following describes the procedure of pieces of processing executed by the information processing apparatus 20 in the third embodiment. The initialization processing and the packet relay processing are described.

(Initialization Processing)

Figure 11:
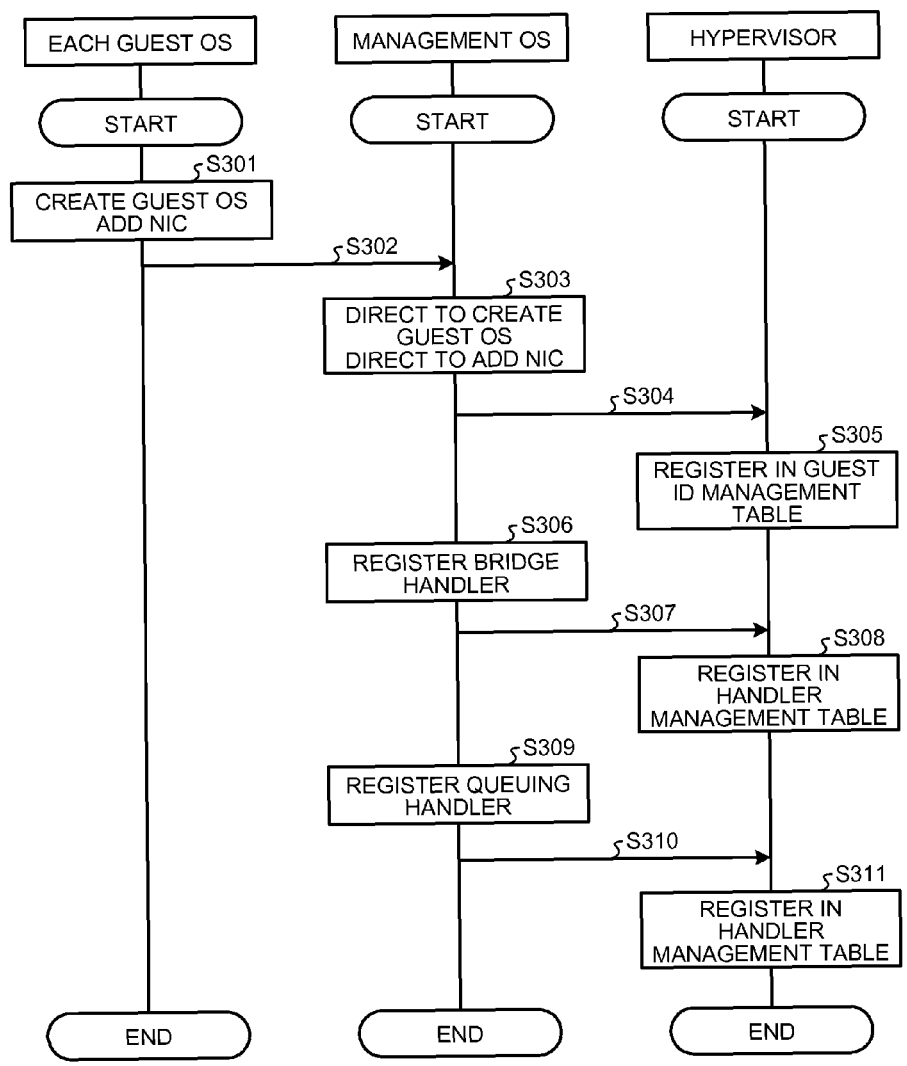
FIG. 11 is a sequence diagram illustrating the procedure of initialization processing executed by the information processing apparatus 20 in the third embodiment.

FIG. 11 is a sequence diagram illustrating the procedure of the initialization processing executed by the information processing apparatus 20 in the third embodiment. As illustrated in FIG. 11, pieces of processing from S301 to S308 are the same as the pieces of processing at S101 to S108 as described above with reference to FIG. 7, and detailed description thereof is omitted.

After executing S301 to S308, the management OS outputs a registration direction of a queuing handler to the hypervisor 31 (S309 and S310). That is to say, the management OS maps the net-back to the net-front of the generated guest OS, and notifies the hypervisor 31 of the address of a computer program calling the buffer corresponding to the net-back.

Subsequently, the information storage unit 35 of the hypervisor 31 registers the notified storage destination of the computer program calling the queuing handler from the management OS in the handler management table 34 (S311). The processing of registering the bridge handler and the processing of registering the queuing handler are not always executed in the order as illustrated in FIG. 11. For example, they may be executed in parallel, or the processing of registering the queuing handler may be executed before the processing of registering the bridge handler.

(Relay Processing)

Figure 12:
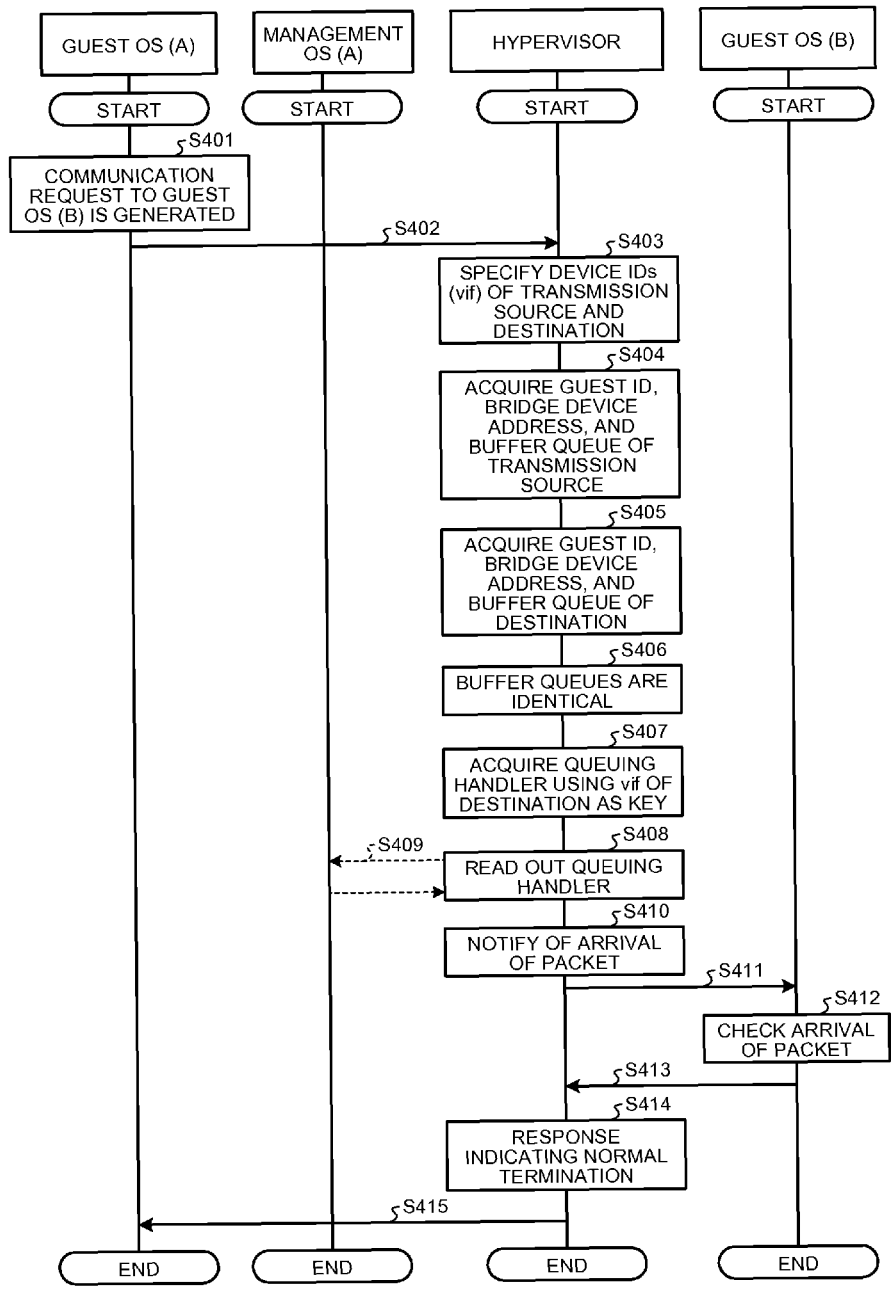
FIG. 12 is a sequence diagram illustrating the procedure of relay processing executed by the information processing apparatus 20 in the third embodiment.
Figure 13:
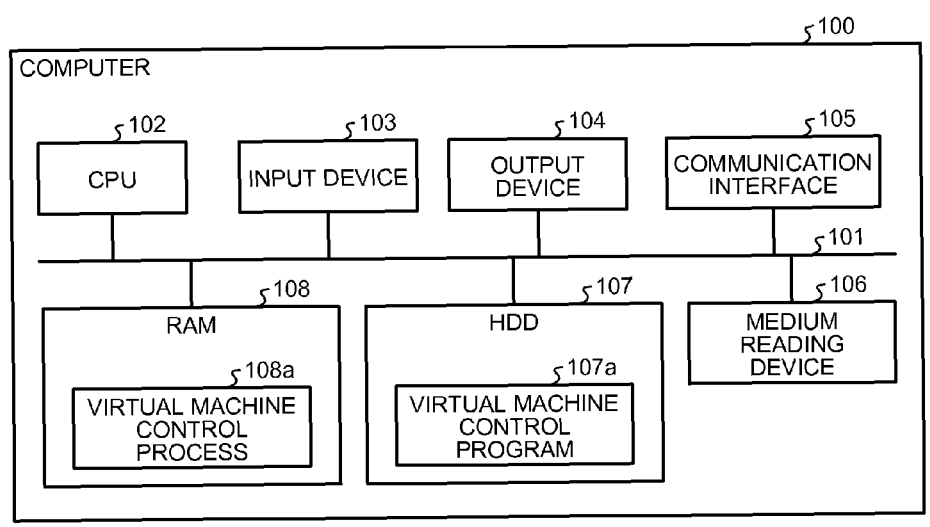
FIG. 13 is a diagram illustrating an example of the hardware configuration of a computer that executes a computer program for virtual machine control.

FIG. 12 is a sequence diagram illustrating the procedure of the relay processing executed by the information processing apparatus 20 in the third embodiment. As illustrated in FIG. 13, when a communication request to the guest OS (B) 25 is generated (S401), the guest OS (A) 24 notifies the hypervisor 31 of the generation of the communication request (S402). That is to say, "eth0" as the virtual interface of the guest OS (A) 24 notifies the hypervisor 31 of arrival of the packet at the net-back "vif1.0" of the management OS (A) 22 that is connected with "eth0".

Subsequently, the guest specifying unit 36 of the hypervisor 31 executes S403 based on the packet having arrived at the net-back "vif1.0". That is to say, the guest specifying unit 36 extracts the MAC address of the guest OS (A) 24 as the transmission source and the MAC address of the guest OS (B) 25 as the destination from the packet. The guest specifying unit 36 specifies the device ID of the net-back that is connected to the guest OS (A) 24 as the transmission source and the device ID of the net-back that is connected to the guest OS (B) 25 as the destination with reference to the MAC management table 32 using the respective MAC addresses as keys.

Subsequently, the guest specifying unit 36 acquires the guest ID, the bridge device address, and the buffer queue corresponding to the device ID of the transmission source from the guest ID management table 33 using the device ID of the transmission source as a key (S404). In the same manner, the guest specifying unit 36 acquires the guest ID, the bridge device address, and the buffer queue corresponding to the device ID of the destination from the guest ID management table 33 using the device ID of the destination as a key (S405).

Subsequently, the guest specifying unit 36 determines whether the buffer queue specified at S304 and the buffer queue specified at S305 are identical (S406). It is herein assumed that they are identical.

After that, the handler specifying unit 37 acquires the queuing handler, the structure identifier, and the guest page table from the handler management table 34 using the device ID of the net-back that is connected to the guest OS (B) 25 as the destination as a key (S407).

Subsequently, the operation controller 38 reads out the queuing handler from the specified bridge handler address using the specified buffer queue as an argument, and operates it (S408 and S409). In this manner, the operation controller 38 adds the packet to the buffer specified by operating the queuing handler.

Subsequently, the operation controller 38 notifies the guest OS (B) 25 of arrival of the packet (S410 and S411), the guest OS (B) 25 having the net-front "eth0" mapped to the net-back "vif2.0" that is bridge-connected to the net-back "vif1.0" through "br0".

The guest OS (B) 25 checks the arrival of the packet, that is, reception of the packet (S412), and notifies the hypervisor 31 of the normal reception (S413). The operation controller 38 of the hypervisor 31 notifies the guest OS (A) 24 as the transmission source of a response indicating that the packet has been received by the destination normally (S414 and S415).

This configuration enables the hypervisor 31 to register a routine of adding the packet to the queue in the net-back in the handler management table 34 as the queuing handler. The hypervisor 31 can execute the processing of storing the packet in the buffer in which the packet to be received by the guest OS as the destination forms the queue, instead of the management OS. As a result, the hypervisor 31 can reduce an address region or the like to read out instead of the management OS in comparison with operating the entire virtual bridge device instead of the management OS, thereby speeding up the communication between the guest OSs.

Fourth Embodiment

Although the embodiments of the present invention have been described above, the invention may be worked in various different modes other than the above-mentioned embodiments. The following describes different embodiments.

(Combined Use with Management OS)

For example, an information processing apparatus to be disclosed can combine the case where the hypervisor operates the bridge handler instead of the management OS and the case where the hypervisor requests the management OS to operate the bridge handler. For example, the hypervisor 31 of the disclosed information processing apparatus may request the management OS to relay the packet as in the conventional technique, when the bridge device addresses are not identical at S206 in FIG. 8. That is to say, the hypervisor 31 of the disclosed information processing apparatus requests the management OS to relay the packet when the net-back that is connected to the guest OS as the transmission source and the net-back that is connected to the guest OS as the destination are not bridge-connected.

That is to say, when the transmission source and the destination are not connected to the same bridge, the hypervisor 31 requests the management OS to relay the packet. Thus, the conventional technique can be used when information that is managed by the hypervisor 31 is increased because the management OS and virtual bridge device are involved. As a result, the memory capacity and the like that are used by the hypervisor 31 can be reduced, so that communication between the guest OSs is sped up. In addition, the communication between the guest OSs can be expected to be sped up without incorporating setting information or the like of the bridge devices over the management OSs into the hypervisor 31, and the cost of developing the hypervisor 31 can be reduced. The above-mentioned processing can also be applied to S406 in FIG. 12. In this case, it can also be determined whether the buffer queues are identical, instead of the above-mentioned bridge device addresses.

(Communication Between Processors)

An information processing apparatus to be disclosed can also call a registered handler from an interrupt handler when communication with a different processor is made. For example, the information processing apparatus 20 holds an interrupt target register that stores therein the guest IDs for identifying a guest OS as an interrupt destination, the MAC addresses of the guest OSs, and identifiers for identifying a processor that operates the guest OS in a correspondence manner. Furthermore, the information processing apparatus 20 stores the initial addresses of the interrupt handlers so as to correspond to the guest IDs and the like in the handler management table 34.

In this configuration, the hypervisor 31 of the information processing apparatus 20 determines whether the guest OS as an interrupt request source and the guest OS as an interrupt request destination operate with the same processor with reference to the interrupt target register when interrupt such as communication between the guest OSs is generated. When it is determined that they operate with the same processor, the hypervisor 31 generates interrupt processing as in the conventional technique. When it is determined that they operate with different processors, the hypervisor 31 reads out a corresponding interrupt handler from the handler management table 34 and operates the interrupt handler instead of an interrupt controller or the like. This can reduce communication between the processors when communication with the different processor is generated, thereby executing the interrupt processing over the processors at high speed.

(System)

All or a part of the pieces of processing that have been described to be executed automatically among the pieces of processing described in the embodiments can be performed manually. All or a part of the pieces of processing that have been described to be executed manually can be performed automatically with a well-known method. In addition, the processing procedures, control procedures, specific technical terms, and pieces of information including various pieces of data and parameters in the description above and drawings can be modified as desired unless otherwise specified.

The components of each device as illustrated in the drawings are functionally conceptual and are not always physically configured as illustrated in the drawings. That is to say, specific modes of separation and integration of the devices are not limited to those in the drawings. In other words, all or a part of them can be separated or integrated functionally or physically based on any desired unit in accordance with various loads, usage conditions, and the like. In addition, all or any part of the processing functions that are executed in the devices may be implemented with a CPU and a computer program to be analyzed and executed on the CPU, or may be achieved as hardware with a wired logic.

(Hardware)

The various pieces of processing as described in the above-mentioned embodiments can be implemented by executing a prepared computer program by a computer system such as a personal computer and a work station. The following describes an example of the computer system that executes the computer program having the functions same as those in the above-mentioned embodiments.

FIG. 13 is a diagram illustrating an example of the hardware configuration of a computer that executes a computer program for virtual machine control. As illustrated in FIG. 13, a computer 100 includes a central processing unit (CPU) 102, an input device 103, an output device 104, a communication interface 105, a medium reading device 106, a hard disk drive (HDD) 107, and a random access memory (RAM) 108. The components as illustrated in FIG. 13 are connected to one another through a bus 101.

The input device 103 is a mouse or a keyboard, the output device 104 is a display or the like, and the communication interface 105 is an interface such as an NIC. The HDD 107 stores therein a virtual machine control program 107a and pieces of information of the tables as illustrated in FIG. 4 to FIG. 6. Although the HDD 107 is employed as an example of a recording medium, various computer programs may be stored in another kind of computer-readable recording medium such as a read only memory (ROM), a random access memory (RAM), and a compact disc read only memory (CD-ROM) to be read by the computer. The storage medium may be arranged at a remote location, and the computer may acquire and use the computer programs by accessing the storage medium. In this case, the computer may store the acquired computer programs in its own recording medium for use.

The CPU 102 reads the virtual machine control program 107a and loads it on the RAM 108 to operate a virtual machine control process 108a for executing the functions as described with reference to FIG. 3, for example. That is to say, the virtual machine control process 108a executes the same functions as the information storage unit 35, the guest specifying unit 36, the handler specifying unit 37, and the operation controller 38 as illustrated in FIG. 3. Thus, the computer 100 reads out and executes the computer program, thereby operating as the information processing apparatus that executes the method for virtual machine control.

Furthermore, the computer 100 can also achieve the same functions as those in the above-mentioned embodiments by reading the virtual machine control program 107a from the recording medium by the medium reading device 106 and executing the read virtual machine control program 107a. The computer program referred in other embodiments is not limited to be executed by the computer 100. For example, the invention can be applied in the same manner to the case where another computer or a server executes the computer program and the case where the computer and the server execute the computer program in corporation.

According to an aspect of the embodiment, communication between guest OSs can be sped up.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a virtual machine control program that causes an information processing apparatus to execute a process comprising:
    operating a plurality of virtual machines on the information processing apparatus, the plurality of virtual machines including a first virtual machine having a function of achieving communication between virtual machines;
    holding a first management table in which information for identifying virtual machines and information for identifying virtual network interfaces of the virtual machines correspond to each other, and a second management table including information for identifying the first virtual machine, information for identifying virtual network interfaces of two virtual machines relayed by the first virtual machine, and information relating to a virtual bridge that is used by the first virtual machine;
    extracting information for identifying virtual machines as a transmission source and a transmission destination from a packet corresponding to a communication request when the communication request from a virtual machine is acquired, and first determining whether the extracted virtual machines as the transmission source and the transmission destination use the same virtual bridge based on the first management table and the second management table;
    when it is determined that the same virtual bridge is used, executing processing of the virtual bridge based on the information relating to the virtual bridge and relaying the packet corresponding to the communication request to the virtual machine as the transmission destination; and
    when it is determined that the same virtual bridge is not used, notifying the first virtual machine relaying the virtual network interface of the virtual machine as the transmission source of arrival of the packet.

2. The computer-readable recording medium according to claim 1, wherein
    the executing includes executing program of the virtual bridge based on the information relating to the virtual bridge.

3. The computer-readable recording medium according to claim 1, wherein
    the executing includes executing program calling a buffer which stores therein the packet to be received by the virtual machine as the destination and writing the packet into the buffer.

4. The computer-readable recording medium according to claim 1, the process further includes
    extracting an identifier of a virtual device corresponding to the virtual machine that has transmitted the packet and an identifier of a virtual device corresponding to the virtual machine as the destination of the packet,
    specifying storage destinations of virtual bridges corresponding to the respective extracted identifiers from a bridge storage unit storing therein identifiers for identifying virtual devices that are used by the respective virtual machines and storage destinations of virtual bridges to which the respective virtual devices are connected in a correspondence manner, and
    second determining whether the specified storage destinations of the respective virtual bridges are identical, wherein
    the first determining includes determining, when it is determined that the storage destinations of the respective virtual bridges are identical at the second determining, that the transmission source and the transmission destination use the same virtual bridge.

5. The computer-readable recording medium according to claim 1, the process further includes
    third determining, when any virtual machine of the virtual machines generates an interrupt request, whether a processor with which the virtual machine as a generation source of the interrupt request is operated and a processor with which a virtual machine as an execution destination of the interrupt request is operated are the same,
    reading a storage destination of an interrupt handler corresponding to the processor with which the virtual machine as the execution destination of the interrupt request is operated from an interrupt storage unit storing therein storage destinations of interrupt handlers so as to correspond to identifiers for identifying the processors when it is determined that the processors are not the same, and
    executing the read interrupt handler.

6. A virtual machine control method comprising:
    operating a plurality of virtual machines on an information processing apparatus, the plurality of virtual machines including a first virtual machine having a function of achieving communication between virtual machines;

holding a first management table in which information for identifying virtual machines and information for identifying virtual network interfaces of the virtual machines correspond to each other, and a second management table including information for identifying the first virtual machine, information for identifying virtual network interfaces of two virtual machines relayed by the first virtual machine, and information relating to a virtual bridge that is used by the first virtual machine;

extracting information for identifying virtual machines as a transmission source and a transmission destination from a packet corresponding to a communication request when the communication request from a virtual machine is acquired, and first determining whether the extracted virtual machines as the transmission source and the transmission destination use the same virtual bridge based on the first management table and the second management table;

when it is determined that the same virtual bridge is used, executing processing of the virtual bridge based on the information relating to the virtual bridge and relaying the packet corresponding to the communication request to the virtual machine as the transmission destination; and when it is determined that the same virtual bridge is not used, notifying the first virtual machine relaying the virtual network interface of the virtual machine as the transmission source of arrival of the packet.

7. An information processing apparatus comprising:

an operating unit that operates a plurality of virtual machines on the information processing apparatus, the plurality of virtual machines including a first virtual machine having a function of achieving communication between virtual machines;

a first management table that stores information for identifying virtual machines and information for identifying virtual network interfaces of the virtual machines, in an associated manner;

a second management table that stores information for identifying the first virtual machine, information for identifying virtual network interfaces of two virtual machines relayed by the first virtual machine, and information relating to a virtual bridge that is used by the first virtual machine;

a determining unit that extracts information for identifying virtual machines as a transmission source and a transmission destination from a packet corresponding to a communication request when the communication request from a virtual machine is acquired, and that determines whether the extracted virtual machines as the transmission source and the transmission destination use the same virtual bridge based on the first management table and the second management table;

a relaying unit that, when it is determined that the same virtual bridge is used, executes processing of the virtual bridge based on the information relating to the virtual bridge and that relays the packet corresponding to the communication request to the virtual machine as the transmission destination; and a notifying unit that, when it is determined that the same virtual bridge is not used, notifies the first virtual machine relaying the virtual network interface of the virtual machine as the transmission source of arrival of the packet.

* * * * *